Feb. 12, 1957     E. W. KLEEMAN     2,780,984
SEDIMENT REMOVER FOR DEEP FRYING
Filed Jan. 18, 1954
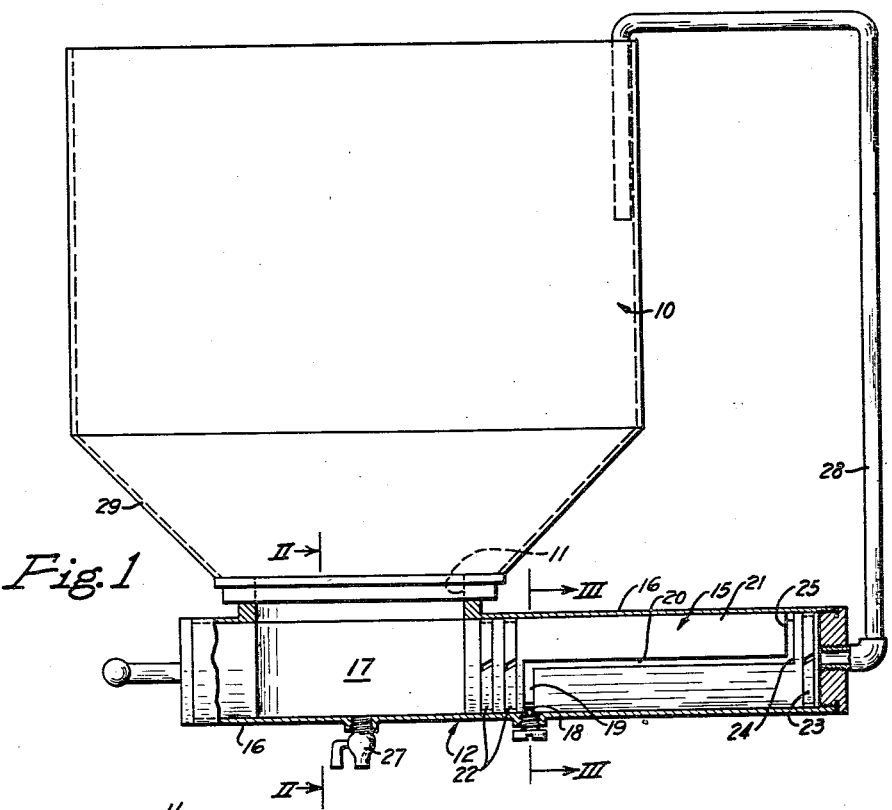
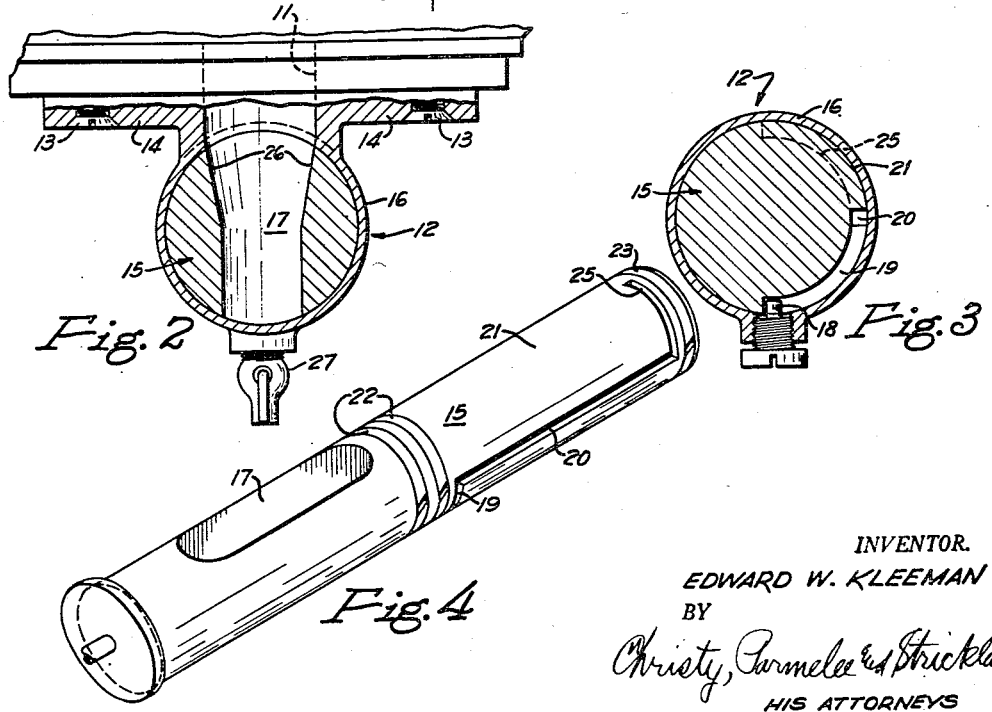
INVENTOR.
EDWARD W. KLEEMAN
BY
Christy, Parmelee and Strickland
HIS ATTORNEYS

United States Patent Office 2,780,984
Patented Feb. 12, 1957

2,780,984
SEDIMENT REMOVER FOR DEEP FRYING

Edward W. Kleeman, Crafton, Pa.

Application January 18, 1954, Serial No. 404,726

3 Claims. (Cl. 99—408)

This invention relates to a sediment remover for a deep frying kettle.

More particularly the invention relates to a trap-out valve by which sediment deposited in a body of fat in a deep frying kettle may be collected and removed from the bottom of the kettle without removing the body of fat from the kettle or cooling down the cooking fat.

In deep frying kettles, a deep body of oil or frying fat is continuously held in a heated condition, generally at a temperature suitable for frying instantly. Many different kinds of food are fried in these kettles, some of which are coated with bread crumbs, corn meal, or wheat flour. Also food such as French fried potatoes, which have no coating, undergo some break-up during the frying operation. From the coated or uncoated food, crumbs and food particles become detached and stay in the kettle until they become charred.

It has become customary for the oil or fat to be drawn off and strained several times a day in order to remove the detached particles. This requires that the oil be cooled and again be reheated before the kettle may be used, and therefore the kettle may not be available for use for long periods of time. The most undesirable thing, however, is to require a cook to wait until a large body of oil may be raised to the frying temperature before starting to fry food.

The primary object of the present invention is to provide a trap-out valve by which sediment may be collected therein and removed from a frying kettle without drawing off the fat or cooling it, and while the kettle is in continued use.

Another object of the invention is to provide a trap-out valve for a frying kettle by which the sediment may be drawn out of the kettle while it is in use with the minimum loss of frying fat.

In accordance with these objects, one feature of the invention is to provide a draw-off valve having a sediment pocket in which the sediment may accumulate with the pocket so arranged that the heavy sediment will displace the frying fat and allow the sediment to be removed without carrying much fat with it.

With these and other objects and features in view, the invention consists in the improved sediment trap-out valve as hereinafter illustrated and described and particularly defined in the appended claims.

The various features of the invention are shown in the accompanying drawings in which:

Fig. 1 is a view in side elevation with parts in section showing the improved draw-off valve attached to a deep frying kettle;

Fig. 2 is a vertical sectional view of the draw-off valve taken on the line II—II of Fig. 1;

Fig. 3 is a vertical sectional view of the valve barrel taken on the line III—III of Fig. 1; and Fig. 4 is a perspective view of the working barrel of the draw-off valve.

The draw-off valve used in the deep frying kettle of the present invention is attached to the bottom of the kettle and a sediment chamber is formed in the valve where the sediment from deep frying accumulates when the kettle is in use. After the chamber becomes partially or fully filled with sediment, the valve may be turned through an angle of 90° to bring a portion of the valve barrel into position to close a discharge opening at the bottom of the kettle as the valve barrel is drawn outwardly to bring the sediment chamber to the outside of the valve to permit the sediment to be discharged from the valve. Thereafter the valve may be moved back to the collecting position, and the valve chamber rotated into position to register with the opening at the bottom of the kettle preparatory to receiving sediment. This operation may be carried out while the kettle is being heated and the frying oil or fat is maintained at a frying temperature. The removal of sediment does not interfere with the cooking or frying operation, and the fat may be kept clear so that the food being fried will not be contaminated with or discolored by charred sediment.

Referring to the drawings, a deep frying kettle 10 has a discharge opening 11 at the bottom thereof, which opens into a trap-out valve 12. The trap-out valve is connected to the bottom of the kettle by means of screws 13 which clamp flanges 14 against the bottom of the kettle to provide a leak-proof joint.

The valve consists of a barrel 15 mounted in a cylinder 16, the barrel having a sediment chamber 17 which registers with the opening 11 in the bottom of the kettle. Fig. 2 shows the valve in position for accumulating sediment while the kettle is in a heated condition. When the valve is in the position shown in Fig. 2, a pin 18 mounted in the cylinder 16 projects into a groove 19 formed on the periphery of the barrel 15. With the pin in the groove 19, the barrel 15 may not be moved longitudinally of the cylinder. When it is desired to withdraw sediment, the barrel is rotated clockwise through an arc of 90° to bring the pin into register with a groove 20 in the barrel. In this position the barrel may be drawn outwardly of the cylinder to bring a surface 21 across the opening 11 at the bottom of the kettle. At that time the sediment chamber 17 is outside of the cylinder 16, and packing rings 22 and 23 maintain a sealing connection between the plunger 15 and the cylinder 16. When the cylinder is drawn sufficiently far to bring the end 24 of the groove 20 into contact with the pin 18, the plunger may be rotated through an additional arc of 90° to bring the pin into a groove 25. At this time the sediment chamber 17 will be in a vertical position with the outwardly flaring sides 26 of the chamber at the bottom, which will permit the sediment to readily fall out of the chamber. Thereafter the plunger may be rotated in a counter-clockwise direction to bring the pin 18 to the groove 20. The plunger may then be pushed longitudinally of the cylinder and again rotated counter-clockwise through an angle of 90° to bring the sediment chamber 17 into the position illustrated in Fig. 2.

If any oil or frying fat escapes around the plunger while the plunger is withdrawn from the kettle outlet, this oil may be withdrawn through a draw-off valve 27.

If any oil or frying fat escapes around the packing rings 22 and 23 and gets behind the plunger 15, this oil will be moved by the plunger through a line 28 back into the kettle 10.

The kettle 10 may be heated by an electrical heater which may be placed in the kettle, or an electrical resistance heater may be placed around the frusto-conical base 29 of the kettle. This heater is not shown because it does not form any part of the present invention.

With the construction outlined above, the sediment which accumulates at the bottom of the kettle in the valve may be drawn off by manipulating the valve as described above, and the sediment removed while the kettle is in heated condition and at a frying temperature. The sediment chamber may then be returned in position to accumulate more sediment, and the frying operation may be continued without the accumulation of sediment that may char and interfere with the appearance of the foods being fried.

The trap-out valve has a safety device which controls its operation to provide that the valve may not be open to discharge sediment without the plunger closing the bottom of the kettle.

The preferred form of the invention having been thus described, what is claimed as new is:

1. A trap valve attachment for frying receptacles comprising a cylinder and a support for holding the cylinder in a horizontal position at the bottom of the receptacle, a plunger rotatable in the cylinder and slidable therein from a retracted to an extended position, the cylinder having a port in the top thereof through which material may enter the cylinder from the receptacle, the plunger having a cavity therein which registers with the port only when the plunger is rotated in retracted position and having an extension which closes said port when the plunger is in extended position, and interfitting means on the plunger and cylinder for restraining said plunger from sliding movement out of retracted position until it is rotated sufficiently to move said cavity out of register with said port and for holding said plunger against rotation at positions between its retracted and extended positions and allowing rotational movement through a limited arc only at the retracted and extended positions.

2. A trap valve attachment for frying receptacles comprising a cylinder and a support for holding the cylinder in a horizontal position at the bottom of the receptacle, a plunger rotatable in the cylinder and slidable therein from a retracted to an extended position, the cylinder having a port in the top thereof through which material may enter the cylinder from the receptacle, the plunger having a cavity therein which registers with the port only when the plunger is rotated in retracted position, and cooperating guide means on the cylinder and plunger for controlling the turning and sliding movements of the plunger in a manner to enable the plunger to be rotated 180° to bring the cavity from a position where it registers with said port to a position where it is inverted with respect to the first position only by a sequential turning, sliding and turning movement of the plunger from its retracted to its extended position.

3. A trap valve attachment for frying receptacles comprising a cylinder and a support for holding the cylinder in a horizontal position at the bottom of the receptacle, a plunger rotatable in the cylinder and slidable therein from a retracted to an extended position, the cylinder having a port in the top thereof through which material may enter the cylinder from the receptacle, the plunger having a cavity therein which registers with the port when the plunger is in retracted position, and cooperating guide means on the cylinder and plunger for controlling the turning and sliding movements of the plunger in a manner to enable the plunger to be rotated 180° to bring the cavity from a position where it registers with said port to a position where it is inverted with respect to the first position only by movement of the plunger from its retracted to its extended position, said means comprising a groove on the plunger having its opposite ends angularly displaced 180° and its length in an axial direction equal to the over length of travel of the plunger, and a pin on the cylinder engaged in said groove.

References Cited in the file of this patent

UNITED STATES PATENTS

| | | |
|---|---|---|
| 765,815 | Christen | July 26, 1904 |
| 1,945,849 | Ferrandino | Feb. 6, 1934 |
| 2,237,189 | McCormack et al. | Apr. 1, 1941 |
| 2,338,964 | Pappas | Jan. 11, 1944 |
| 2,354,487 | Thompson | July 25, 1944 |
| 2,652,767 | Childs | Sept. 22, 1953 |
| 2,661,844 | Kolbet | Dec. 8, 1953 |

FOREIGN PATENTS

| | | |
|---|---|---|
| 5,452 | Great Britain | June 27, 1891 |